A. V. Ryder.
Horse Rake.
Nº 50391. Patented Oct. 10, 1865.

Witnesses.
J. M. Holloway
T. C. Smith

Inventor.
Andrew V. Ryder
Per Daniel Breed Atty

UNITED STATES PATENT OFFICE.

ANDREW V. RYDER, OF GERMANO, OHIO.

IMPROVEMENT IN HORSE-RAKES.

Specification forming part of Letters Patent No. 50,391, dated October 10, 1865.

*To all whom it may concern:*

Be it known that I, A. V. RYDER, of Germano, in the county of Harrison and State of Ohio, have invented a new and useful Improvement in Horse-Rakes; and I do hereby declare that the following is a full and exact description thereof, reference being had to the accompanying drawings, and to letters of reference marked thereon.

My invention consists in a peculiar arrangement and combination of levers and other devices for elevating and clearing horse-rakes.

Figure 1:
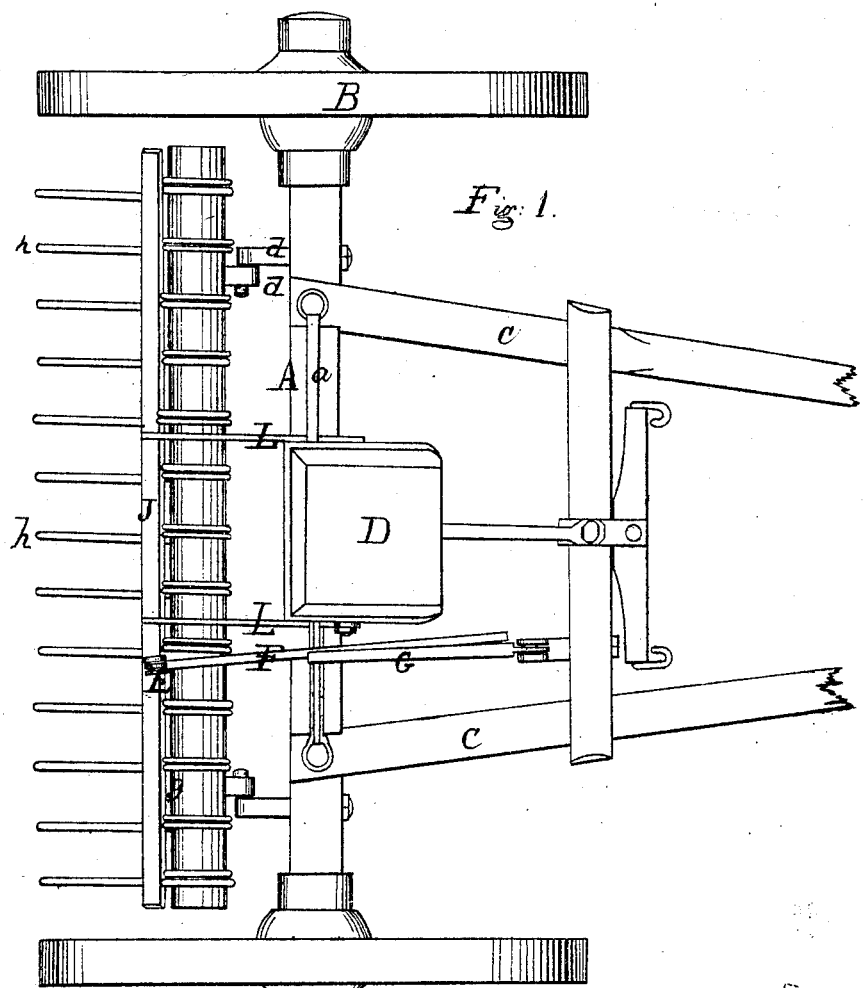
Figure 2:
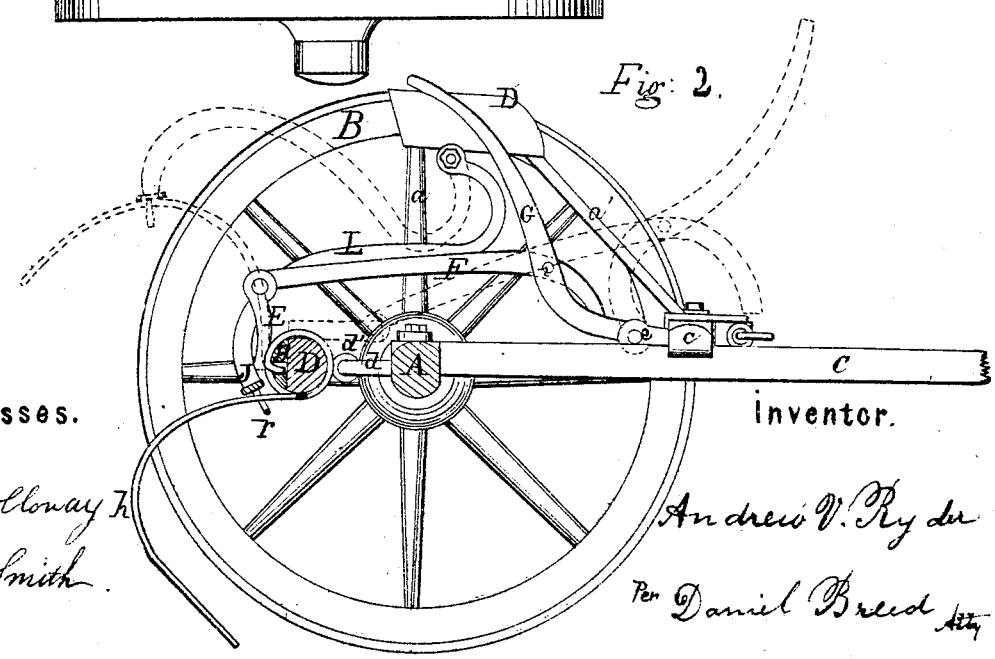

In the accompanying drawings, Figure 1 is a top view of a horse-rake with my improvement attached. Fig. 2 is a longitudinal vertical section of the machine.

In the construction of my machine the wheels B and axle A may be of ordinary form, with shafts C for attaching the horse. The seat D is supported upon standards $a$ and braces $a'$. The rake is attached to the axle by hinges $d$ and $d'$, so as to rise and fall in the usual manner. The rake-teeth are made of wire inserted into the rake-head D', as represented at $g$, and then wound twice around the rake-head, and then curved, as shown at $h$, Fig. 2. A bar, J, runs across the teeth, and is hinged to the seat by swinging bars L. These bars L are so curved and hinged and the teeth so curved that the bar J is pushed outward toward the points of the teeth as the latter are elevated, as shown in red lines, Fig. 2. This motion of the bar J pushes the hay from the rake. But it sometimes happens in machines where such bar is used that the hay will slide under the bar and become entangled. In order to prevent this difficulty I propose to employ a staple or loop, $r$, upon every tooth of the rake. This arrangement will prevent the possibility of entangling the hay under the bar J.

For the purpose of elevating the rake I have arranged two levers, F and G, connected with an arm, E. These levers are hinged at $e$ and $i$. The upper end of the lever G is near the driver's seat, so that the driver can easily operate the rake.

I am aware that the devices employed in my machine are not new. Therefore I limit myself to the peculiar arrangement and combination above described.

Having thus fully described my invention, what I claim, and desire to secure by Letters Patent of the United States, is—

The particular arrangement and combination of the levers G and F with the swinging bars L, clearing-bars J, and rake-head D', substantially in the manner and for the purposes set forth.

ANDREW V. RYDER.

Witnesses:
E. HEADINGTON,
JOSEPH HALL.